INVENTOR.
R. W. DUNCAN
D. W. ORAHOOD
BY Paul W. Hemminger

June 27, 1967 R. H. DUNCAN ET AL 3,328,697

SELECTOR FOR SELECTING THE BEST RESPONDING ONE OF A PLURALITY OF EQUAL RANK DEVICES

Filed June 28, 1963 2 Sheets-Sheet 2

3,328,697
SELECTOR FOR SELECTING THE BEST RESPONDING ONE OF A PLURALITY OF EQUAL RANK DEVICES

Robert H. Duncan, Elmhurst, and Donald W. Orahood, Chicago, Ill., assignors to International Telephone and Telegraph Corporation, New York, N.Y., a corporation of Maryland Filed June 28, 1963, Ser. No. 291,573
14 Claims. (Cl. 325—304)

This invention relates in general to selector equipment and in particular to selector equipment for continuously selecting the best responding one of a number of equal rank devices.

In mobile radio-telephony, for example, the transmitter located in the vehicle of a mobile telephone subscriber has a limited distance of radio propagation since power consumption limitations preclude high wattage transmission. Additionally, obstructions and reflecting elements often block propagation of the radio signals in certain directions. Thus, it is necessary to place radio receivers at a number of locations throughout a large area to insure reliable radio reception from the mobile transmitters. However, when a number of receivers each receive the same signals, a problem arises in selecting the receiver that has the strongest signal or the signal having the best signal-to-noise ratio.

It is an object of the present invention to provide selecting equipment for selecting a particular one of a plurality of radio receivers which has the best received signals.

Another problem involved in selector equipment of the above character resides in selecting only one of two or more receivers each having equally acceptable signals so that possible phase cancellation of audio signals does not occur. Accordingly, it is another object to provide a selector equipment for selecting only one of a plurality of receivers having signals of equal signal-to-noise ratios.

As the mobile transmitter moves from one location to another, the signals having the greatest amplitude or best signal-to-noise ratio may be received by one receiver at one interval and received by a different receiver at another interval. In keeping with the foregoing objects in insuring reliable receiving coverage, a continuous selection of the receiver having the best signal must be effected. Still another object, therefore, is to provide selector equipment which continuously monitors all receivers and selects the one having the best reception at any one interval.

A problem related to selecting the receiver having the best reception at any one time is concerned with intermittent and rapid switching from one receiver to another as a result of intermittent noise signals. Thus, another object is to provide selector equipment of the foregoing character which requires a predetermined differential in signal amplitude before one receiver is released in favor of a different receiver having the better signal amplitude.

Figure 2A:
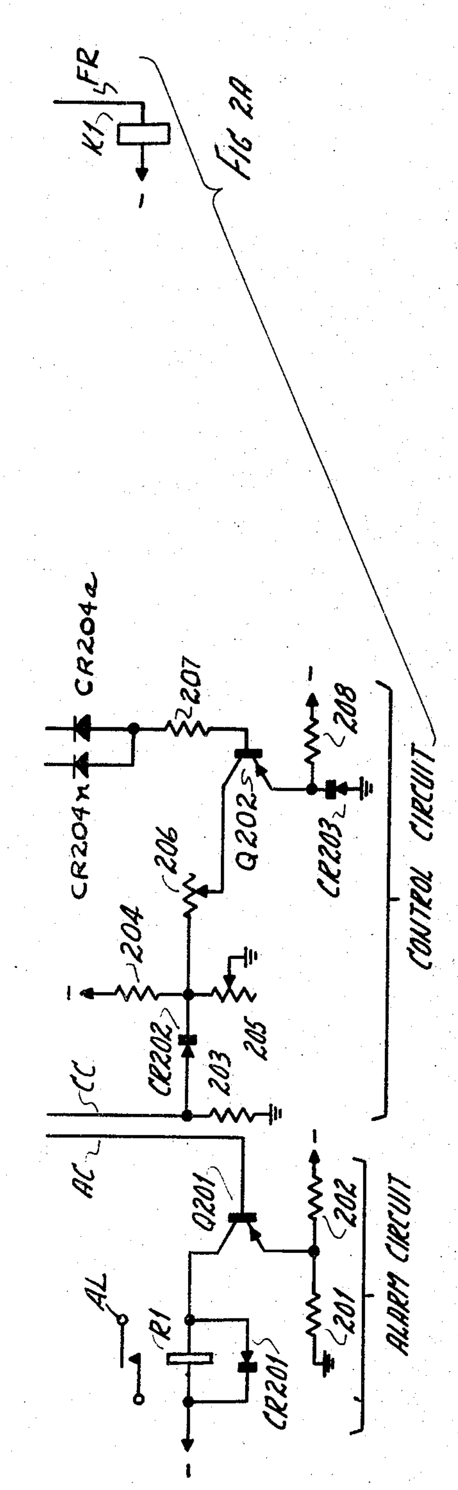
Figures 1, 3:
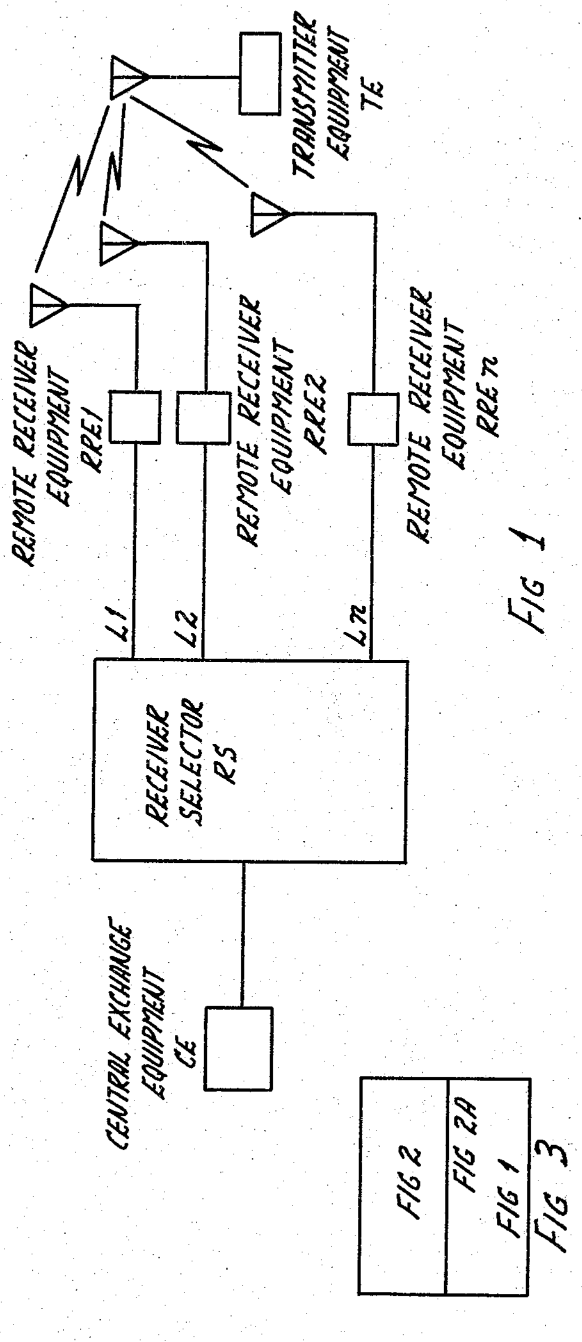
Figure 2:
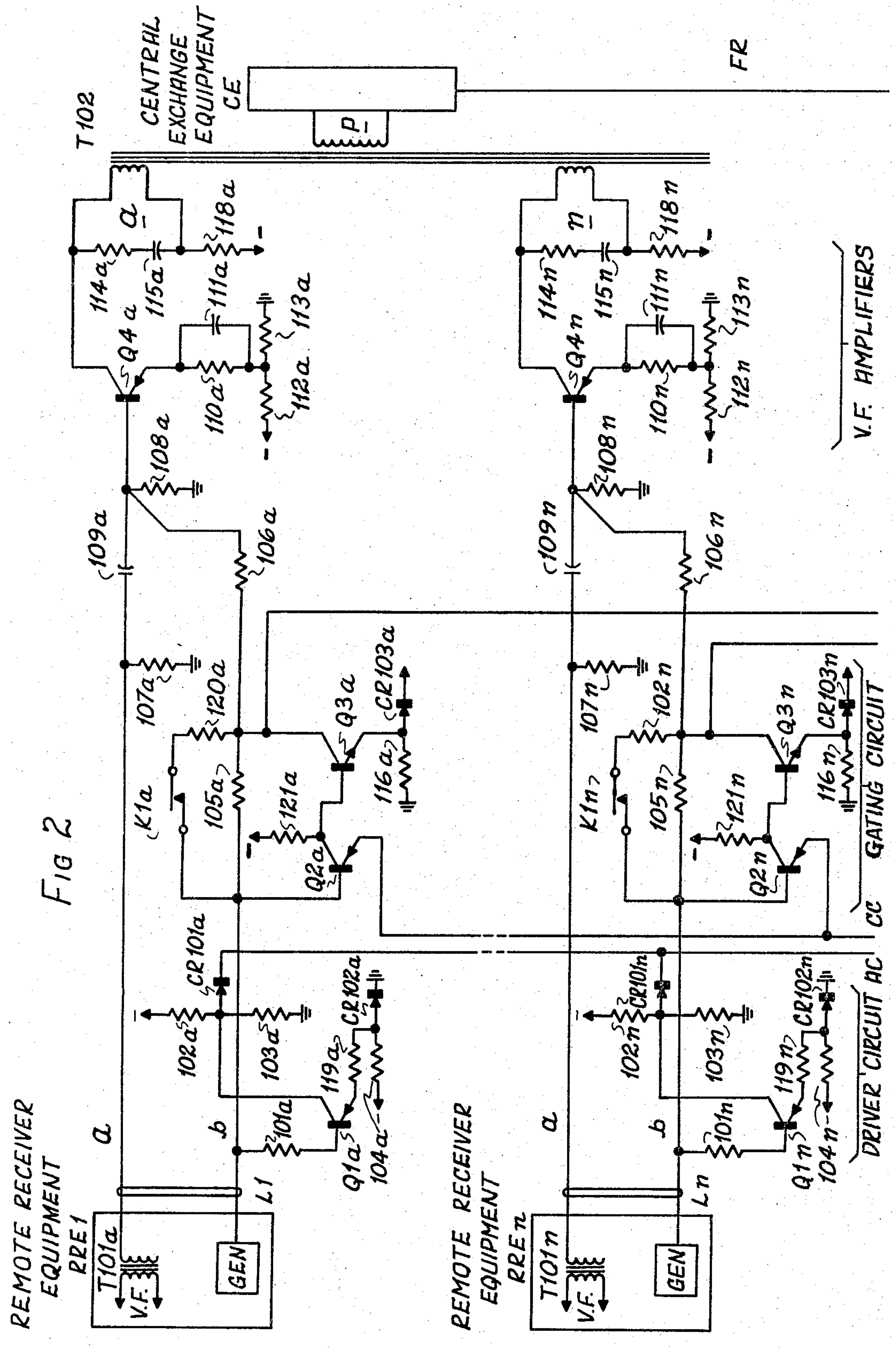

Still other objects and features of this invention will become apparent and the invention will be best understood when the specification is read in conjunction with the accompanying drawings comprising FIGS. 1 to 3 in which:

FIG. 1 shows a block diagram of the receiving portion of a mobile radio telephone system embodying the invention;

FIGS. 2 and 2*a* show a schematic diagram of the circuitry employed in the received selector of FIG. 1; and FIG. 3 shows the manner in which the sheets of drawing should be arranged.

Referring now to FIG. 1 of the drawings, a brief description will be given of the operation of the mobile radio telephone system embodying the invention.

FIG. 1 shows a portion of the base equipment comprising central exchange equipment CE connected to the inventive receiver selector RS which in turn is connected by land lines L1 to L*n* to a plurality of respectively corresponding remote receivers units RRE1 to RRE*n*. These remote receiver units are radio-linked with transmitter equipment TE which represents the mobile transmitter. The purpose of the receiver selector RS is to connect to the central exchange equipment CE, the output of the remote receiver unit having the best signal-to-noise ratio.

The remote receiver units RRE1 to RRE*n* each include apparatus for transmitting over the land lines to the receiver selector RS, a predetermined "receiver-on" negative direct-current potential. This "receiver-on" negative direct-current potential is varied more negative according to the value of the signal-to-noise ratio of the signals being received by each receiver. The receiver selector determines which remote receiver unit is most desirable and connects such receiver unit to the central exchange equipment CE through speech amplifiers in the receiver selector. When the negative signals vary in excess of the noted differential as a result of changes in received signal strengths, the receiver selector alters is previous selection in accordance therewith.

Referring now to FIGS. 2 and 2A of the drawings, the receiver selector includes a plurality of channels coresponding respectively to the remote receiver units RRE1 to RRE*n*. For reasons of brevity, only the first and last channels are shown. These channels are connected at one end to the respectively corersponding remote receiver units and are connected at the other end through transformer T102 to a common channel extending to the central equipment CE.

Each channel includes a driver circuit, which in conjunction with an alarm relay, provides an alarm in the event of a failure in any remote receiver unit.

Each channel also includes a gating circuit, which under control of common control apparatus, is operated when the noted negative direct-current potential from its remote receiver units indicates such remote unit to have signal with the best signal-to-noise ratio. Each gating circuit, when operated, triggers an amplifiers circuit in its channel to amplify and forward the received speech signals to the central equipment.

*Driver circuit*

A detailed description of the operation of the driver circuits and associated alarm circuit will now be given.

The driver circuit of the first channel comprises a PNP transistor Q1*a* having an emitter bias determined by resistances 119*a*, 104*a* and diode CR102*a*. The base of transistor Q1*a* is connected to line conductor *b* of line L1 by resistance 101*a* and the collector thereof is connected to the voltage divider comprising resistances 102*a* and 103*a*. A similar transistor driver circuit is provided for each of the other channels.

Under normal operating conditions, a negative direct-current potential of one volt is present on conductor *b* of each of the land lines L1 to L*n*. These potentials are sufficient to maintain each of the driver transistors in their conducting stage, causing the collectors thereof to assume near ground potential.

The collector of each of the driver transistors is connected through an associated diode, such as CR101*a*, over wire AC to the base of the alarm circuit transistor Q201. Transistor Q201 is in its cut-off condition by virtue of the noted ground potential appearing on its base. These diodes CR101*a* to CR101*n* and associated resistances 102*a*, 103*a* and 102*n*, 103*n* comprise "or" gates connected to the alarm transistor.

As long as each driver transistor remains in its conducting stage by virtue of the noted one volt potential remaining on the line wire *b*, the alarm transistor is non-conducting and no alarm condition exists.

Responsive to the failure of a remote receiver unit, the noted one volt potential disappears from the base of the associated driver transistor, driving it into cut-off. At this time, the near ground potential appearing on the collector of the driver transistor changes to a negative potential and, through the associated diode, causes the alarm transistor to conduct and signal an alarm condition.

Alarm transistor Q201 has its emitter biased by resistances 201 and 202. The base is connected to the "or" gates as noted and a relay R1 is connected in the collector circuit. When the base of transistor Q201 becomes negative with respect to the emitter thereof by virtue of the failure of any pilot signal on wire *b* of the land lines, transistor Q201 conducts. Relay R1 operates and at its contacts energizes an alarm lead AL.

*Gating circuit*

The operation of the gating circuit of each channel will now be described. Each gating circuit includes a pair of transistors such as Q2*a*, Q3*a* and Q2*n*, Q3*n*. Under pilot voltage conditions only, each of the gating transistors is non-conductive.

The emitters of the first or primary transistor of each gating pair are connected in common to resistance 203 which determines the minimum base drive voltage required to cause the primary transistors Q2*a*, Q2*n* to conduct. This bias voltage is set by the network comprising resistance 204, potentiometer 205 and diode CR202. For purposes of this description, assume that the bias is set at two volts. Thus, the base of each primary gating transistor is less negative from the pilot signal than the emitter thereof which is set by the bias network. Accordingly, the primary transistors are non-conductive.

The base of the primary gating transistor of each channel is connected to the line wire *b* of the associated land line and the collectors thereof are connected to the base of the associated or secondary gating transistor and to the negative supply voltage through a resistance such as 121*a*, 121*n*.

The emitter of the secondary gating transistor Q3*a*, Q3*n*, is biased by resistance 116*a*, 116*n* and diode CR103*a*, CR103*n*. The collector of the secondary gating transistor is connected to the base of its associated primary gating transistor through resistance 105*a*, 105*n*. It is also connected to the base of its associated amplifier transistor Q4*a*, Q4*n* through resistance 106*a*, 106*n*. Further, the collector of each secondary gating transistor is connected through an associated diode (CR204*a* to CR204*n*) to the base of the control transistor Q202.

When the pilot signal of a negative one volt appears on line wire *b* of the land lines, the primary gating transistor of each channel is non-conductive as above noted since the bias appearing on the emitter thereof is more negative by virtue of the setting of the noted bias network comprising resistances 203, 204, diode CR202 and potentiometer 205. During the time the primary transistor is non-conductive, supply potential appears on the base of the secondary gating transistor and maintains it in a cut-off condition. During the time the secondary gating transistor is cut-off, the one volt pilot signal appears on the base of the amplifier transistor (Q4*a*–Q4*n*) maintaining it cut-off, even though speech signal from line conductor *a* might appear on the base simultaneously with the pilot signal.

Assuming that signals are transmitted by the remote transmitter and received, with different signal levels, by all of the receivers, then the pilot potential would be replaced by a negative potential of an amplitude corresponding to the signal-to-noise ratio of the signals received by associated receivers. For purposes of this description, assume that a negative potential of six volts appears on line conductor *b* of land line L1 and that a negative potential of four volts appears on line conductor *b* of land line L*n*. Under these conditions, the primary gating transistor associated with the channels corresponding to land lines L1 and L*n* would be biased toward conduction.

As soon as the primary gating transistor having the greatest negative voltage appearing on its base is switched into its conduction state, a negative potential of approximately the signal amplitude appears across resistor 203 which, over wire CC, is connected in common to the emitters of all of the other primary gating transistors. All primary transistors except one are cut-off since their emitter is more negative then the incoming signal on the associated line wire *b*. Thus, only one primary gating transistor is left in the conducting state and such transistor is the one associated with the remote receiver having the best signal-to-noise ratio.

When the primary one of the pair of gating transistors conducts, its collector and the base of the associated secondary gating transistor assume substantially the supply voltage, causing the secondary gating transistor to conduct. The potential appearing on the collector of the secondary gating transistor appears on the base of the amplifier transistor of the same channel, on the base of the control transistor Q202 through the associated one of the diodes CR204*a* to CR204*n*; and also a portion of this voltage is fed back to the base of the associated primary gating transistor through resistance 105*a*, 105*n*. This voltage feedback during the transient switching period of the gating circuit speeds up its switching operation and during the static period of the gating circuit, biases the primary gating transistor further into conduction. This feedback provides a larger bias differetnial than before, and prevents rapid switching of the gating circuits when the signal amplitudes of the other non-selected receivers provide substantially equal signals as the selected one.

More specifically, this feedback potential adds to the incoming signal-to-noise potential of the selected receiver and provides a voltage differential to prevent a different primary gating transistor from operating when the negative signal-to-noise potential of an associated receiver equals or slightly exceeds that of the selected receiver. Thus, the first selected receiver of two or more receivers having equal reception will retain control over its operated gating circuit.

*Control circuit*

Transistor Q202, located in the control circuit conducts as a result of the conduction of any secondary gating circuit transistors. When transistor Q202 conducts, the potential appearing on the collector thereof alters the potential between resistances 204 and 205. The amount of variation is controlled by variable resistance 206 which is set to a predetermined value corresponding to the threshhold release level for the operated primary gating transistor. The minimum bias potential appearing on the emitters of the primary gating transistors is thus set once a primary gating transistor is operated. This overrides the inherent characteristic of the operated primary transistor in attempting to follow the incoming signals variations and not release at the proper time.

When the signal-to-noise ratio of the selected receiver deteriorates to an unacceptable level, the gating circuit thus must relinquish control since the minimum signal needed for continued conduction is set by potentiometer 206. The signals are no longer amplified and passed to the central equipment. Such an arrangement precludes ticketing of a call which is unintelligible.

If the signal-to-noise ratio decreases in one receiver and increases in another to a value in excess of the noted differential feedback voltage, then the primary gating transistor associated with the receiver having this better reception conducts and by emitter follower action biases the originally conducting primary gating transistor to cut-off.

Then the amplifier transistor associated with the newly selected channel operates.

*Amplifier circuit*

As hereinbefore noted, the conduction of any secondary gating transistor increases the negative potential appearing on the base of its associated voice-frequency amplifier, switching it into conduction. This voice frequency amplifier thereupon amplifies the received voice frequency signals from the receiver having the best reception at any one time. The amplified output signals are passed through the windings of transformer T102 to the central exchange equipment CE.

*Lock control*

While the foregoing switching operations in continuously selecting the receiver having the best reception provide a high grade mobile telephone system, these switching operations may be deterimental if switching occurs during the digit signalling interval since the digit signals may be distorted or lost. Relay K1, connected to the central exchange equipment CE by wire FR, is operated when the noted digit signalling is initiated and remains operated during the dialing period. Contacts K1*a* to K1*n* of relay K1 place low-valued resistances 120*a* to 120*n* in shunt respectively corresponding feedback resistances 105*a* to 105*n*. The operation of the noted contacts increases the differential voltage appearing on the base of the operated one of the primary gating transistor and precludes the switching of channels even though the reception of a non-selected receiver is substantially better than the reception of the selected receiver.

While the principles of the invention have been described above in connection with specific circuitry and applications, it is to be understood that this description is made only by way of example and not as a limitation on the scope of the invention.

We claim:

1. In a selector system for selecting one of a number of equal rank devices according to incoming signals indicative at each instant of the response of its associated device, a plurality of inputs for respectively corresponding equal rank devices, a common output, switching means operable responsive to the said incoming signals for connecting the said common output exclusively to the input associated with the device having the best response, feedback means for applying signals from an output terminal of the switching means associated with the device having the best response to provide an additional voltage differential to an input terminal of said switching means tending to keep the operating device in a conductive state in preference over other devices subsequently receiving signals at substantially similar levels, and means thereafter responsive to said incoming signals indicating an unconnected one of said devices having a response better than said connected device for operating the said switching means to transfer the said common output from said connected device to the last-said unconnected device.

2. A selector system as set forth in claim 1, wherein the said switching means comprises separate switches for respectively corresponding ones of said inputs and wherein means is provided for precluding the simultaneous operation of a plurality of said switches.

3. In a selector system for selecting one of a number of equal rank devices according to incoming signals of an amplitude indicative at each instant of the response of its associated device, a plurality of inputs for respectively corresponding equal rank devices, a common output, switching means operable responsive to the amplitude of said incoming signals exceeding a predetermined value for connecting the said common output exclusively to the input associated with the device having the greatest signal amplitude, feedback means for applying signals from an output terminal of the switching means associated with the device having the greatest signal amplitude to provide an additional voltage differential to an input terminal of said switching means tending to keep the operating device in a conductive state in preference over other devices subsequently receiving signals at substantially similar levels, and means responsive to said incoming signals of an unconnected one of said devices having an amplitude greater than the amplitude of the signals of the said connected device for operating the said switching means to transfer the said common output from said connected device to the last-said unconnected device.

4. A selector system as set forth in claim 3, in which differential means associated with the feedback means supplies said additional voltage differential to increase the amplitude of said incoming signals associated with the said connected device.

5. A selector system as set forth in claim 4 wherein said switching means includes amplifier means and wherein said differential means provides feedback signals for said amplifier means.

6. A selector system as set forth in claim 4 wherein said switching means includes amplifier means having an input controlled by said incoming signals and an output connected to said feedback means including the input through said differential means.

7. In a selector system for selecting one of a number of equal rank devices according to incoming signals of an amplitude indicative at each instant of the response of its associated device, a common output, a plurality of inputs for respectively corresponding equal rank devices, means connecting said inputs in parallel to said common output, switching means operable responsive to the amplitude of said incoming signals exceeding a predetermined value for connecting the said common output exclusively to the input associated with the device having the greatest signal amplitude, blocking means associated with respective ones of said inputs for normally barring the transmission of signals from the associated device to said common output, means operable responsive to the amplitude of any incoming signals exceeding a predetermined value for disabling the blocking means associated with the device having the greatest signal amplitude to permit transmission therefrom to the said common output, feedback means for applying signals from an output terminal of the switching means associated with the device having the greatest signal amplitude to provide an additional voltage differential to an input terminal of said switching means tending to keep the operating device in a conductive state in preference over other devices subsequently receiving signals at substantially similar levels, and means responsive to said incoming signals indicating a barred one of said devices having a signal amplitude greater than the signal amplitude of the unbarred device for enabling the blocking means associated with the unbarred device and for disabling the blocking means associated with the last-said barred device to permit transmission from the last-said barred device exclusively to said common output.

8. A selector system as set forth in claim 7 wherein selectively adjustable means is provided for setting the said amplitude value at which said incoming signals are effective to disable one of said blocking means.

9. A selector system as set forth in claim 8 wherein means is provided for connecting all of said inputs to said selectively adjustable means to control the said predetermined amplitude value of all inputs simultaneously.

10. In a selector system for selecting one of a number of equal rank devices according to incoming signals of an amplitude indicative at each instant of the response of its associated device, a common link, a plurality of channels for respectively corresponding ones of said devices, connecting means in each of said channels for connecting any associated device to said common link, switching means operable responsive to the amplitude of said incoming signals exceeding a predetermined value for operating the connecting means of the channel associated with the device having the greatest signal amplitude to connect the common link exclusively to the last-said channel, a common output, switching means operable responsive to the amplitude of said incoming signals exceeding a predetermined value for connecting the said common output exclusively to the channel associated with the device having the greatest signal amplitude, feedback means for applying signals from an output terminal of the switching means associated with the device having the greatest signal amplitude to provide an additional voltage differential to an input terminal of said switching means tending to keep the operating device in a conductive state in preference over other devices subsequently receiving signals at substantially similar levels, and means responsive to the incoming signals of an unconnected one of said devices having an amplitude greater than the amplitude of the signals of the connected device for operating the said switching means to restore the said operated connected means and to operate the connecting means associated with the last-said unconnected device.

11. A selector system as set forth in claim 10 wherein each said channel comprises a speech path and a signal path and wherein said switching means are controlled over said signal path independently of said speech path.

12. A selector system as set forth in claim 11 wherein each said connecting means comprises a speech amplifier connected to the associated speech path and wherein said amplifiers are selectively operated by said switching means.

13. A selector system as set forth in claim 12 wherein said switching means comprises a separate switch associated with respectively corresponding signal paths.

14. A selector system as set forth in claim 10 wherein said connecting means comprises a normally non-conducting semi-conductor device and wherein said switching means includes means for rendering said semi-conductor devices selectively conductive.

References Cited

UNITED STATES PATENTS

| | | | |
|---|---|---|---|
| 2,507,160 | 5/1950 | Hugenholtz et al. | 325—304 |
| 2,898,455 | 8/1959 | Hymas et al. | 325—304 |
| 2,985,755 | 5/1961 | Giesselman | 325—304 |

KATHLEEN H. CLAFFY, *Primary Examiner.*

R. S. BELL, *Assistant Examiner.*